(12) United States Patent
Sigler et al.

(10) Patent No.: US 10,166,627 B2
(45) Date of Patent: Jan. 1, 2019

(54) ALUMINUM ALLOY TO STEEL WELDING PROCESS

(71) Applicant: GM GLOBAL TECHNOLOGY OPERATIONS LLC, Detroit, MI (US)

(72) Inventors: David R. Sigler, Shelby Township, MI (US); James G. Schroth, Troy, MI (US); Blair E. Carlson, Ann Arbor, MI (US); Yelena Myasnikova, Buffalo, NY (US); David Yang, Shanghai (CN)

(73) Assignee: GM Global Technology Operations LLC, Detroit, MI (US)

(*) Notice: Subject to any disclaimer, the term of this patent is extended or adjusted under 35 U.S.C. 154(b) by 724 days.

(21) Appl. No.: 14/503,969

(22) Filed: Oct. 1, 2014

(65) Prior Publication Data
US 2015/0096962 A1 Apr. 9, 2015

Related U.S. Application Data

(60) Provisional application No. 61/886,752, filed on Oct. 4, 2013.

(51) Int. Cl.
*B23K 11/10* (2006.01)
*B23K 11/16* (2006.01)
(Continued)

(52) U.S. Cl.
CPC ............. *B23K 11/20* (2013.01); *B23K 11/115* (2013.01); *B23K 35/0261* (2013.01)

(58) Field of Classification Search
CPC ... B23K 11/115; B23K 11/20; B23K 35/0261; B23K 11/10; B23K 11/11; B23K 11/16; B23K 11/00
(Continued)

(56) References Cited

U.S. PATENT DOCUMENTS 7,850,059 B2 12/2010 Kobayashi et al.
7,935,908 B2 5/2011 Nakagawa et al.
(Continued)

FOREIGN PATENT DOCUMENTS

CN 1946506 A 4/2007
CN 101274387 A 10/2008
(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.
(Continued)

*Primary Examiner* — Michael G Hoang
(74) *Attorney, Agent, or Firm* — Reising Ethington P.C.

(57) ABSTRACT

A resistance spot welding method may involve spot welding a workpiece stack-up that includes a steel workpiece and an aluminum alloy workpiece that overlap one another to provide a faying interface. A pair of opposed welding electrodes are pressed against opposite sides of the workpiece stack-up with one welding electrode contacting the aluminum alloy workpiece and the other welding electrode contacting the steel workpiece. The welding electrodes are constructed so that, when an electrical current is passed between the electrodes and through the workpiece stack-up, the electrical current has a greater current density in the steel workpiece than in the aluminum alloy workpiece to thereby concentrate heat within a smaller zone in the steel workpiece. Concentrating heat within a smaller zone in the steel workpiece is believed to modify the solidification behavior of the resultant molten aluminum alloy weld pool in a desirable way.

20 Claims, 8 Drawing Sheets

(51) Int. Cl.
    *B23K 11/00*         (2006.01)
    *B23K 11/20*         (2006.01)
    *B23K 11/11*         (2006.01)
    *B23K 35/02*         (2006.01)

(58) Field of Classification Search
    USPC ...... 219/91.2, 92, 91.23, 118, 93, 94, 117.1,
                                219/119; 428/594; 228/101
    See application file for complete search history.

(56) References Cited

U.S. PATENT DOCUMENTS

| | | | |
|---|---|---|---|
| 7,943,883 B2 | 5/2011 | Doira et al. | |
| 7,984,840 B2 | 7/2011 | Kobayashi et al. | |
| 8,020,749 B2 | 9/2011 | Kobayashi et al. | |
| 8,058,584 B2 | 11/2011 | Miyamoto et al. | |
| 8,487,206 B2 | 7/2013 | Urushihara et al. | |
| 2009/0255908 A1 | 10/2009 | Sigler et al. | |
| 2011/0097594 A1* | 4/2011 | Tanaka | B23K 11/115 428/594 |
| 2012/0129006 A1* | 5/2012 | Kanai | B23K 11/115 428/683 |
| 2013/0189023 A1 | 7/2013 | Spinella | |

FOREIGN PATENT DOCUMENTS

| | | |
|---|---|---|
| JP | 11342477 | 12/1999 |
| JP | 2003251470 A | 9/2003 |
| JP | 4971821 | 7/2012 |
| JP | 5051608 B2 | 10/2012 |
| JP | 2013027890 A | 2/2013 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Yang et al., U.S. Appl. No. 14/181,020 entitled "Electrode for Resistance Spot Welding of Dissimilar Metals," filed Feb. 14, 2014.

Yang et al., U.S. Appl. No. 14/181,955 entitled "Resistance Spot Welding Steel and Aluminum Workpieces with Protuberance," filed Feb. 17, 2014.

Sigler et al., U.S. Appl. No. 14/268,422 entitled "Resistance Spot Welding of Steel to Pre-Coated Aluminum," filed May 2, 2014.

Sigler et al., U.S. Appl. No. 14/462,655 entitled "Resistance Spot Welding Steel and Aluminum Workpieces Using Electrode Weld Face Cover," filed Aug. 19, 2014.

Sigler et al, U.S. Appl. No. 14/464,476 entitled "Multi-Step Direct Welding of an Aluminum-Based Workpiece to a Steel Workpiece," filed Aug. 20, 2014.

Schroth et al., U.S. Appl. No. 14/488,799 entitled "Resistance Spot Welding Steel and Aluminum Workpieces with Hot Welding Electrode at Aluminum Workpiece," filed Sep. 17, 2014.

Carlson et al, U.S. Appl. No. 14/503,504 entitled "Resistance Spot Welding Steel and Aluminum Workpieces Using Insertable Cover," filed Oct. 1, 2014.

Sigler et al., U.S. Appl. No. 14/503,969 entitled "Aluminum Alloy to Steel Welding Process," filed Oct. 1, 2014.

Wang et al, U.S. Appl. No. 14/561,746 entitled "Resistance Spot Welding Steel and Aluminum Workpieces with Electrode Insert," filed Dec. 5, 2014.

* cited by examiner

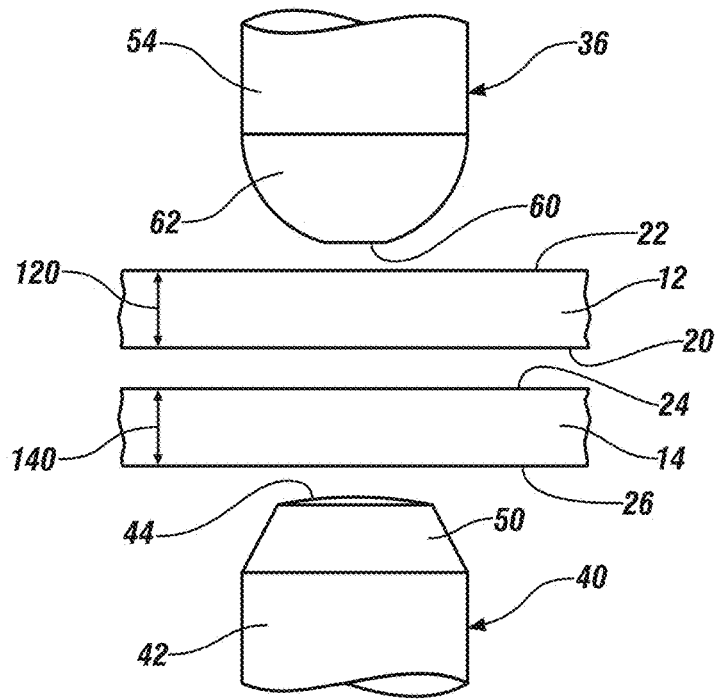
FIG. 3
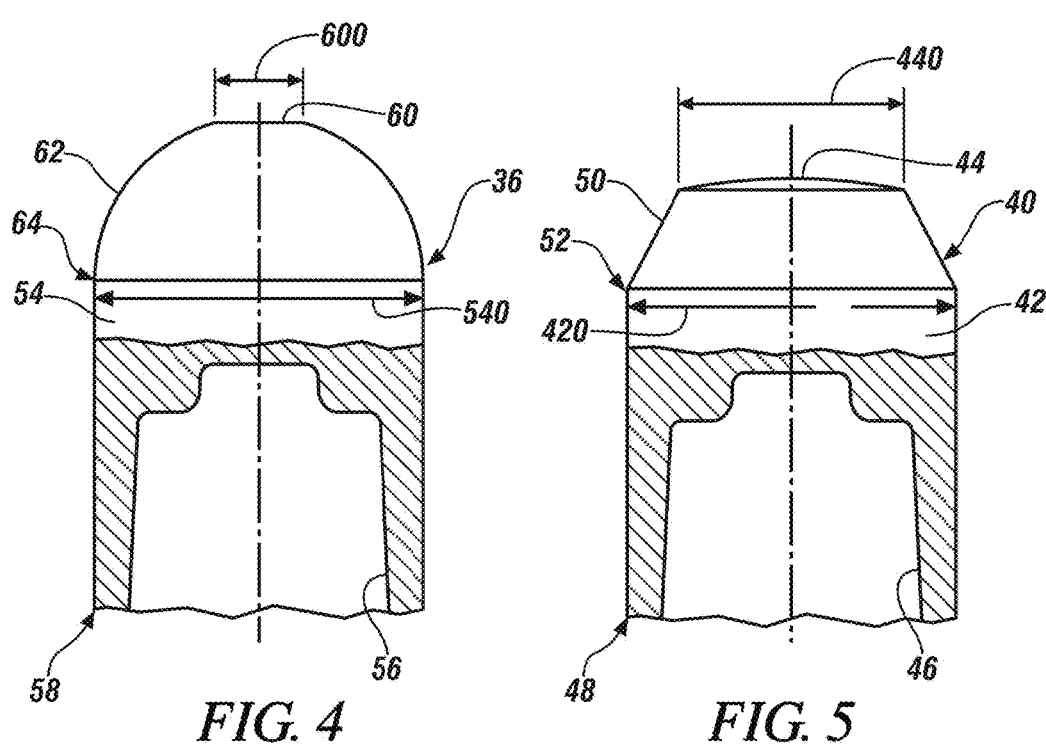
FIG. 4
FIG. 5

ALUMINUM ALLOY TO STEEL WELDING PROCESS

CROSS-REFERENCE TO RELATED APPLICATIONS

This application claims the benefit of U.S. provisional patent application No. 61/886,752, filed on Oct. 4, 2013, the entire contents of which are hereby incorporated by reference.

TECHNICAL FIELD

The technical field of this disclosure relates generally to resistance spot welding and, more particularly, to resistance spot welding a steel workpiece to an aluminum alloy workpiece.

BACKGROUND

Resistance spot welding is a process used by a number of industries to join together two or more metal workpieces. The automotive industry, for example, often uses resistance spot welding to join together pre-fabricated metal workpieces during the manufacture of a vehicle door, hood, trunk lid, or lift gate, among others. A number of spot welds are typically formed along a peripheral region of the metal workpieces or some other bonding region to ensure the part is structurally sound. While spot welding has typically been practiced to join together certain similarly-composed metal workpieces—such as steel-to-steel and aluminum alloy-to-aluminum alloy—the desire to incorporate lighter weight materials into a vehicle platform has generated interest in joining steel workpieces to aluminum alloy workpieces by resistance spot welding. Moreover, the ability to resistance spot weld workpiece stack-ups containing different workpiece combinations (e.g., aluminum alloy/aluminum alloy, steel/steel, and aluminum alloy/steel) with one piece of equipment would increase production flexibility and reduce manufacturing costs.

Resistance spot welding, in general, relies on the resistance to the flow of an electrical current through overlapping metal workpieces and across their faying interface to generate heat. To carry out such a welding process, a pair of opposed spot welding electrodes are typically clamped at diametrically aligned spots on opposite sides of the workpieces at a predetermined weld site. An electrical current is then passed through the metal workpieces from one electrode to the other. Resistance to the flow of this electrical current generates heat within the metal workpieces and at their faying interface. When the metal workpieces being spot welded together are a steel workpiece and an aluminum alloy workpiece, the heat generated at the faying interface initiates a molten weld pool extending into the aluminum alloy workpiece from the faying interface. The molten aluminum alloy weld pool wets the adjacent surface of the steel workpiece and, upon cessation of the current flow, solidifies into a weld nugget that forms all or part of a weld joint between the two workpieces.

In practice, however, spot welding a steel workpiece to an aluminum alloy workpiece is challenging since a number of characteristics of those two metals can adversely affect the strength—most notably the peel strength—of the weld joint. For one, the aluminum alloy workpiece usually contains one or more refractory oxide layers (hereafter collectively "oxide layer") on its surface. The oxide layer, which is composed primarily of aluminum oxides but may also include other oxides, such as magnesium oxides, is electrically insulating and mechanically tough. The surface oxide layer thus raises the electrical contact resistance of an aluminum alloy workpiece—namely, at its faying surface and at its electrode contact point—making it difficult to effectively control and concentrate heat within the aluminum alloy workpiece, and has a tendency to hinder the ability of the molten weld pool to wet the steel workpiece. And while efforts have been made in the past to try and remove the oxide layer from the aluminum alloy workpiece prior to spot welding, such practices can be impractical since the oxide layer has the ability to regenerate in the presence of oxygen, especially with the application of heat from spot welding applications.

The steel workpiece and the aluminum alloy workpiece also possess different properties that tend to complicate the spot welding process. Specifically, steel has a relatively high melting point (~1500° C.) and relatively high thermal and electrical resistivities, while aluminum alloy has a relatively low melting point (~600° C.) and relatively low thermal and electrical resistivities. As a result of these physical differences, most of the heat is generated in the steel workpiece during electrical current flow. This heat imbalance sets up a temperature gradient between the steel workpiece (higher temperature) and the aluminum alloy workpiece (lower temperature) that initiates rapid melting of the aluminum alloy workpiece. The combination of the temperature gradient created during current flow and the high thermal conductivity of the aluminum alloy workpiece means that, immediately after the electrical current has ceased, a situation occurs where heat is not disseminated symmetrically from the weld site. Instead, heat is conducted from the hotter steel workpiece through the aluminum alloy workpiece towards the welding electrode in contact with the aluminum alloy workpiece, which creates steep thermal gradients in that direction.

The development of steep thermal gradients between the steel workpiece and the welding electrode in contact with the aluminum alloy workpiece is believed to weaken the integrity of the resultant weld joint in two primary ways. First, because the steel workpiece retains heat for a longer duration than the aluminum alloy workpiece after the electrical current has ceased, the molten weld pool that has been initiated and grown in the aluminum alloy workpiece solidifies directionally, starting from the region nearest the colder welding electrode (often water cooled) associated with the aluminum alloy workpiece and propagating towards the faying interface. A solidification front of this kind tends to sweep or drive defects—such as gas porosity, shrinkage voids, micro-cracking, and oxide residue—towards and along the faying interface within the aluminum alloy weld nugget. Second, a sustained elevated temperature in the steel workpiece promotes the growth of brittle Fe—Al intermetallic compounds at and along the faying interface. The intermetallic compounds tend to form thin reaction layers between the aluminum alloy weld nugget and the steel workpiece. These intermetallic layers are generally considered part of the weld joint, if present, in addition to the weld nugget. Having a dispersion of weld nugget defects together with excessive growth of Fe—Al intermetallic compounds along the faying interface is thought to reduce the peel strength of the final weld joint.

In light of the aforementioned challenges, previous efforts to spot weld a steel workpiece and an aluminum alloy workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical processes such as self-piercing rivets and flow-drill screws have been used predominantly instead. Both self-piercing rivets and flow-drill screws are considerably slower and have high consumable costs as compared to spot welding. They also add weight to the vehicle body structure, which at some point can begin to counteract the weight savings attained through the use of aluminum alloy workpieces in the first place. Advancements in spot welding that would make the process more capable of joining steel and aluminum alloy workpieces would thus be a welcome addition to the art.

SUMMARY

A method for resistance spot welding a stack-up that includes a steel workpiece and an aluminum alloy workpiece involves contacting opposite sides of the stack-up with opposed welding electrodes at a predetermined weld site. One welding electrode contacts and is pressed against the steel workpiece and the other welding electrode contacts and is pressed against the aluminum alloy workpiece. An electrical current is then passed between the welding electrodes through the stack-up to initiate and grow a molten aluminum alloy weld pool within the aluminum alloy workpiece and at a faying interface of the workpieces. The welding electrodes form a contact patch in their respective workpieces and, after cessation of the current flow, the contact patch formed at the aluminum alloy workpiece is greater in surface area than the contact patch formed at the steel workpiece. The difference in contact patch sizes results in passage of the electrical current through the steel workpiece at a greater current density than in the aluminum alloy workpiece.

The difference in current density between the steel and aluminum alloy workpieces (greater current density in the steel workpiece) concentrates heat within a smaller zone in the steel workpiece as compared to the aluminum alloy workpiece. The weld current schedule can even be regulated, if desired, to initiate a molten weld pool within the steel workpiece in addition to initiating the molten aluminum alloy weld pool within the aluminum alloy workpiece and at the faying interface. The act of concentrating heat within a smaller zone in the steel workpiece—possibly to the extent of initiating a molten steel weld pool—modifies the temperature gradients and, thereby, the solidification behavior of the molten aluminum alloy weld pool. It is believed that these thermally-induced effects can result in a weld joint at the faying interface that has improved peel strength and better overall structural integrity.

In particular, the belief is that concentrating heat within a smaller zone in the steel workpiece as compared to the aluminum alloy workpiece causes temperature gradients to be formed within and around the molten aluminum alloy weld pool, allowing the weld pool to solidify from its outer perimeter towards its center. A solidification front that moves inwards from the weld pool perimeter towards the center of the weld pool, in turn, drives weld defects toward the center of the weld joint where they are less prone to affect the mechanical properties of the weld joint. Concentrating heat so that a steel weld pool is initiated can further help drive defects into the center of the weld joint by causing the steel workpiece to thicken towards the faying interface. Such thickening of the steel workpiece helps the center of the molten aluminum alloy weld pool stay heated so that it solidifies last. The non-planar faying interface created through thickening of the steel workpiece can also help resist crack growth in the ultimately-formed weld joint.

There is a variety of welding electrode constructions and combinations that can be used to spot weld the steel and aluminum alloy workpieces of the stack-up such that a greater electrical current density is achieved in the steel workpiece as compared to the aluminum alloy workpiece. The welding electrode on the steel side, for example, can have a planar or relatively planar weld face with a small diameter while the welding electrode on the aluminum alloy side can have a planar or more radiused weld face of a larger diameter. The two welding electrodes can also be multi-functional electrodes of similar construction that are designed to form contact patches having asymmetric surface areas at the steel and aluminum alloy workpieces. Such welding electrodes, in addition to making the steel workpiece and the aluminum alloy workpiece more spot weldable, can also be used to spot weld stack-ups of steel workpieces and stack-ups of aluminum alloy workpieces if spot welding process flexibility is desired.

BRIEF DESCRIPTION OF THE DRAWINGS

FIG. 3 is a partial exploded side view of the stack-up and opposed welding electrodes depicted in FIG. 2;

FIG. 4 is a side elevational view of the steel welding electrode depicted in FIG. 3;

FIG. 5 is a side elevational view of the aluminum alloy welding electrode depicted in FIG. 3;

DETAILED DESCRIPTION

Figure 1:
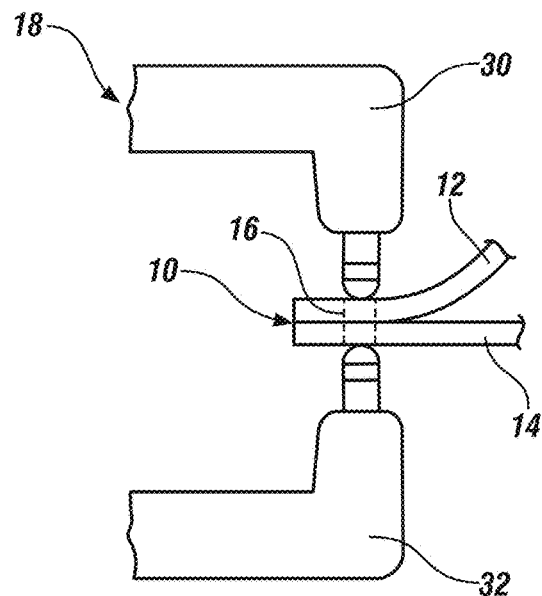
FIG. 1 is a side elevational view of a workpiece stack-up that includes a steel workpiece and an aluminum alloy workpiece that are assembled in overlapping fashion for resistance spot welding at a predetermined weld site by a welding gun.
Figure 2:
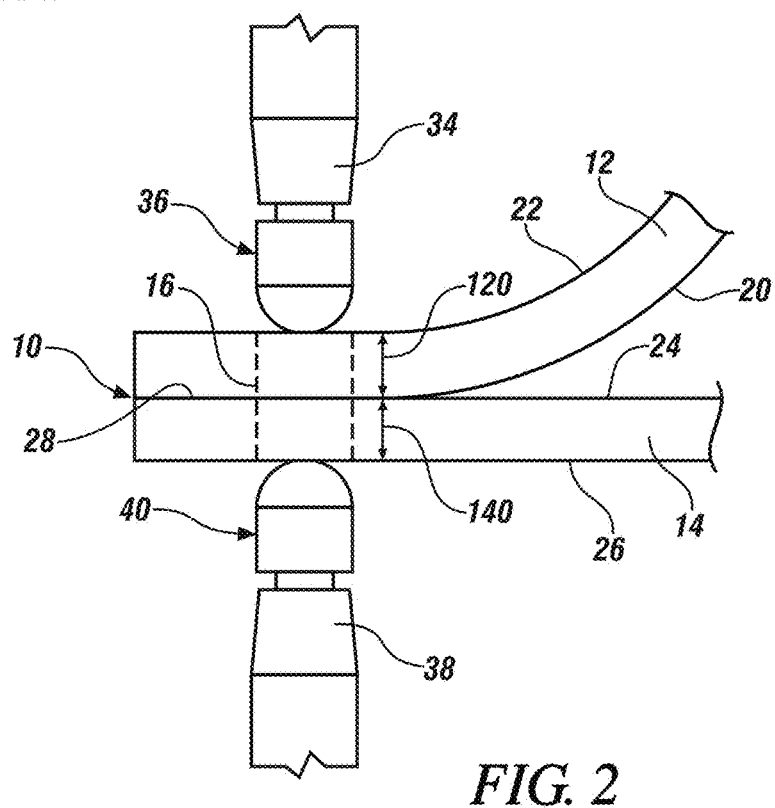
FIG. 2 is a partial magnified view of the stack-up and opposed welding electrodes depicted in FIG. 1.

FIGS. 1-3 generally depict a workpiece stack-up 10 that includes a steel workpiece 12 and an aluminum alloy workpiece 14 that are assembled in overlapping fashion for resistance spot welding at a predetermined weld site 16 by a welding gun 18. The steel workpiece 12 is preferably a galvanized, or zinc-coated, low carbon steel. Other types of steel workpieces may of course be used including, for example, a low carbon bare steel or a galvanized advanced high strength steel (AHSS). Some specific types of steels that may be used in the steel workpiece 12 are interstitial-free (IF) steel, dual-phase (DP) steel, transformation-induced plasticity (TRIP) steel, and press-hardened steel (PHS). Regarding the aluminum alloy workpiece 14, it may be an aluminum-magnesium alloy, an aluminum-silicon alloy, an aluminum-magnesium-silicon alloy, or an aluminum-zinc alloy, and it may be coated with zinc or a conversion coating to improve adhesive bond performance, if desired. Some specific aluminum alloys that may be used in the aluminum alloy workpiece 14 are 5754 aluminum-magnesium alloy, 6022 aluminum-magnesium-silicon alloy, and 7003 aluminum-zinc alloy. The term "workpiece" and its steel and aluminum variations is used broadly in the present disclosure to refer to a sheet metal layer, a casting, an extrusion, or any other piece that is resistance spot weldable, inclusive of any surface layers or coatings, if present.

When stacked-up for spot welding, the steel workpiece 12 includes a faying surface 20 and an electrode-contacting surface 22. Likewise, the aluminum alloy workpiece 14 includes a faying surface 24 and an electrode-contacting surface 26. The faying surfaces 20, 24 of the two workpieces 12, 14 contact one another to provide a faying interface 28 at the weld site 16. The electrode-contacting surfaces 22, 26 of the steel and aluminum alloy workpieces 12, 14, on the other hand, generally face away from each other in opposite directions to make them accessible by a pair of opposed spot welding electrodes. Each of the steel and aluminum alloy workpieces 12, 14 preferably has a thickness 120, 140 that ranges from about 0.3 mm to about 6.0 mm, and more preferably from about 0.5 mm to about 4.0 mm, at least at the weld site 16.

The welding gun 18 is usually part of a larger automated welding operation, and includes a first gun arm 30 and a second gun arm 32 that are mechanically and electrically configured to repeatedly form spot welds in accordance with a defined weld schedule. The first gun arm 30 has a first electrode holder 34 that retains a steel welding electrode 36, and the second gun arm 32 has a second electrode holder 38 that retains an aluminum alloy welding electrode 40. The welding gun arms 30, 32 are operated during spot welding to press their respective welding electrodes 36, 40 against the oppositely-facing electrode-contacting surfaces 22, 26 of the overlapping steel and aluminum alloy workpieces 12, 14. The first and second welding electrodes 36, 40 are typically pressed against their respective electrode-contacting surfaces 22, 26 in diametric alignment with one another at the intended weld site 16.

The steel welding electrode 36 and the aluminum alloy welding electrode 40 are each formed from an electrically conductive material such as a copper alloy. The two welding electrodes 36, 40, as will be further explained below, are constructed to provide a contact patch at the electrode-contacting surface 26 of the aluminum alloy workpiece 14 that is greater in surface area than a contact patch at the electrode-contacting surface 22 of the steel workpiece 12 upon cessation of the passage of electrical current between the electrodes 36, 40. The aluminum alloy contact patch preferably has a surface area that is greater than a surface area of the steel contact patch by a ratio of about 1.5:1 to about 16:1 and, more preferably, from about 2:1 to about 6:1 at that time. The difference in contact patch sizes results in a greater current density in the steel workpiece 12 than in the aluminum alloy workpiece 14.

The difference in current density between the steel and aluminum alloy workpieces 12, 14 concentrates heat within a smaller zone in the steel workpiece 12 as compared to the aluminum alloy workpiece 14. The weld current schedule can even be regulated, if desired, to initiate a molten steel weld pool within the steel workpiece 12 in addition to initiating a molten aluminum alloy weld pool within the aluminum alloy workpiece 14 and at the faying interface 28. The act of concentrating heat within a smaller zone in the steel workpiece 12—possibly to the extent of initiating a molten steel weld pool—modifies the temperature gradients, in particular the radial temperature gradients, to change the solidification behavior of the molten aluminum alloy weld pool located at the faying interface 28 so that defects in the ultimately-formed weld joint are forced to a more desirable location. In some instances, especially when a steel weld pool is initiated in the steel workpiece 12, the concentration of heat in the steel workpiece and the resultant thermal gradients can drive weld defects to conglomerate at or near the center of the weld joint at the faying interface 28, which is conducive to better weld joint integrity and peel strength.

The aluminum alloy welding electrode 40 includes a body 42 and a weld face 44. The body 42, as shown best in FIG. 5, defines an accessible hollow recess 46 at one end 48 for insertion of, and attachment with, the second electrode holder 38 in known fashion. A transition nose 50 may extend from an opposite end 52 of the body 42 up to the weld face 44, but is not required to, as the weld face 44 can extend directly from the body 42 to provide what is commonly referred to as a "full-face electrode." The body 42 is preferably cylindrical in shape with a diameter 420 that ranges from about 12 mm to about 22 mm, or more narrowly from about 16 mm to about 20 mm. The transition nose 50 is preferably frusto-conical in shape, although other alternative shapes such as spherical and elliptical may be suitable as well.

The weld face 44 is the portion of the aluminum alloy welding electrode 40 that makes contact with and is impressed into the electrode-contacting surface 26 of the aluminum alloy workpiece 14 during spot welding to establish a contact patch. The weld face 44 has a diameter 440 and a radius of curvature that, together, are sufficient to prevent excessive indentation into the molten aluminum alloy weld pool and the softened workpiece region surrounding the weld pool. Excessive indentation is typically defined as indentation that meets or exceeds 50% of the thickness 140 of the aluminum alloy workpiece 14. Such indentation can be avoided, for example, by providing the weld face 44 with a diameter 440 of about 6 mm to about 20 mm and a radius of curvature of about 15 mm to planar. In a preferred embodiment, the diameter 440 of the weld face 44 is about 8 mm to about 12 mm and the radius of curvature is about 50 mm to about 250 mm. Additionally, if desired, the weld face 44 can be textured or have surface features such as those described in U.S. Pat. Nos. 6,861,609, 8,222,560, 8,274,010, 8,436,269, and 8,525,066 and U.S. Patent Application Publication No. 2009/0255908.

The steel welding electrode 36 has the same basic components as the aluminum alloy welding electrode 40—namely, a body 54 that defines an accessible hollow recess 56 at one end 58, a weld face 60, and an optional transition nose 62 that extends from the body 54 at an opposite end 64 up to the weld face 60, as shown in FIG. 4. The body 54 is preferably cylindrical in shape with a diameter 540 that ranges from about 12 mm to about 22 mm, or more narrowly from about 16 mm to about 20 mm. The transition nose 62 is preferably spherical in shape, although other alternative shapes such as elliptical and frusto-conical may be suitable as well. While some or all of the portions of the aluminum alloy and steel welding electrodes 40, 36 can be the same—but are not necessarily required to be—the interaction of their weld faces 44, 60 with their respective electrode-contacting surfaces 26, 22 is what renders the current density within the workpieces 12, 14 different.

The weld face 60, like before, is the portion of the steel welding electrode 36 that makes contact with and is impressed into the electrode-contacting surface 22 of the steel workpiece 12 during spot welding to establish a contact patch. Here, the weld face 60 is constructed so that its contact patch (i.e., the one established at the electrode-contacting surface 22 of the steel workpiece 12) is smaller than the contact patch established by the weld face 44 of the aluminum alloy welding electrode 40 at the electrode-contacting surface 26 of the aluminum alloy workpiece 14. In the embodiment shown here in FIG. 4, the weld face 60 of the steel welding electrode 36 has a diameter 600 that ranges from about 4 mm to about 16 mm, more preferably about 5 mm to about 8 mm, and is planar or has a radius of curvature that is greater than about 20 mm.

FIGS. 1-3 and 6-7 illustrate a spot welding process in which the stack-up 10 is spot-welded at the weld site 16 using the welding electrodes 36, 40 described above. The welding gun 18 (partially shown) is configured to provide the electrical current and contact pressure needed to spot weld the steel workpiece 12 to the aluminum workpiece 14. The gun arms 30, 32 of the welding gun 18 may be stationary (pedestal welder) or robotically moveable, as is customary in the art, and are operated during spot welding to contact and press the welding electrodes 36, 40 against the oppositely-facing electrode-contacting surfaces 22, 26 of the steel and aluminum alloy workpieces 12, 14 in diametric alignment with one another at the weld site 16. The clamping force assessed by the gun arms 30, 32 helps establish good mechanical and electrical contact between the welding electrodes 36, 40 and their respective electrode-contacting surfaces 22, 26.

Figure 6:
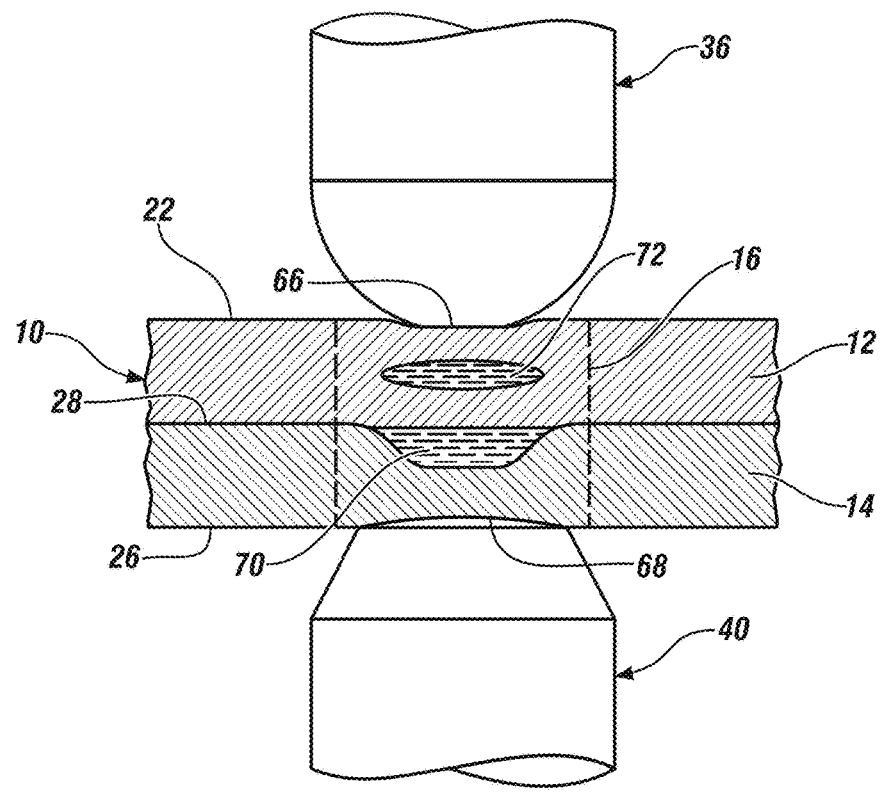
FIG. 6 is a partial cross-sectional view (stack-up shown in cross-section) of the stack-up during spot welding in which the steel welding electrode is contacting an electrode-contacting surface of the steel workpiece and an aluminum alloy welding electrode is contacting an electrode-contacting surface of the aluminum alloy workpiece.

The resistance spot welding process begins by locating the stack-up 10 between the steel and aluminum alloy welding electrodes 36, 40 so that the weld site 16 is generally aligned with the opposed weld faces 60, 44. The workpiece stack-up 10 may be brought to such a location, as is often the case when the gun arms 30, 32 are part of a stationary pedestal welder, or the gun arms 30, 32 may be robotically moved to locate the electrodes 36, 40 relative to the weld site 16. Once the stack-up 10 is properly located, the first and second gun arms 30, 32 converge to contact and press the weld faces 60, 44 of the steel welding electrode 36 and the aluminum alloy welding electrode 40 against the oppositely-facing electrode-contacting surfaces 22, 26 of the steel and aluminum alloy workpieces 12, 14 at the weld site 16, as shown in FIG. 6. The contact pressure imparted by the welding electrodes 36, 40 causes the weld face 60 of the steel welding electrode 36 to begin to form a contact patch 66 at the electrode-contacting surface 22 of the steel workpiece 12 and, likewise, the weld face 44 of the aluminum alloy welding electrode 40 to begin to form a contact patch 68 at the electrode-contacting surface 26 of the aluminum alloy workpiece 14.

An electrical current—typically a DC current between about 5 kA and about 50 kA—is then passed between the weld faces 60, 44 of the steel and aluminum alloy welding electrodes 36, 40 and through the stack-up 10 at the weld site 16 in accordance with an appropriate weld schedule. Resistance to the flow of the electrical current through the workpieces 12, 14 initially causes the steel workpiece 12 to heat up more quickly than the aluminum alloy workpiece 14 since it has higher thermal and electrical resistivities. This heat imbalance causes a temperature gradient to materialize from the steel workpiece 12 to the aluminum alloy workpiece 14. The flow of heat down the temperature gradient toward the water-cooled aluminum alloy welding electrode 40, in conjunction with the generated heat that results from the resistance to the flow of the electrical current across the faying interface 28, eventually melts the aluminum alloy workpiece 14 and forms a molten aluminum alloy weld pool 70, which then wets the faying surface 20 of the steel workpiece 12.

During the time that electrical current is passed, which can last anywhere from about 40 milliseconds to about 1000 milliseconds, the steel contact patch 66 grows very little, while the aluminum alloy contact patch 68 grows considerably more as the weld face 44 of the aluminum alloy welding electrode 40 indents into the softened aluminum alloy workpiece 14. Because in this embodiment the weld face 44 of the aluminum alloy welding electrode 40 is larger than the weld face 60 of the steel welding electrode 36, the aluminum alloy contact patch 68 is greater in surface area than the steel contact patch 66 at the time passage of the electrical current is ceased. This difference in contact patch sizes results in a greater current density being present within the steel workpiece 12 than in the aluminum alloy workpiece 14 during electrical current flow. Increasing the current density in the steel workpiece 12 during electrical current flow results in a more concentrated heat zone within the steel workpiece 12 that can improve the integrity and peel strength of the final weld joint, as will be discussed below in more detail. The concentrated heat zone can—but does not necessarily have to—initiate a molten steel weld pool 72 within the steel workpiece 12.

Figure 7:
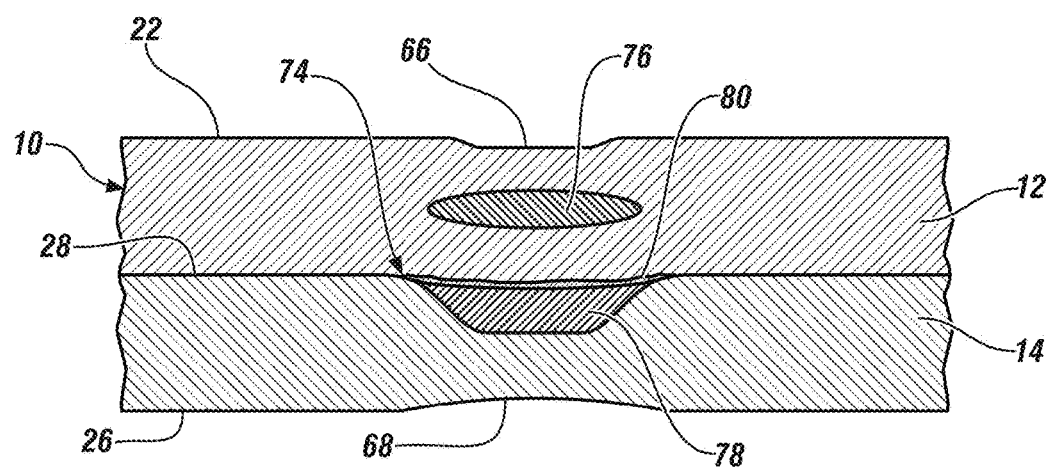
FIG. 7 is a partial cross-sectional view (stack-up shown in cross-section) of the stack-up after cessation of the electrical current in which a weld joint has formed at the faying interface and a steel weld nugget has formed within the steel workpiece.

Upon cessation of the electrical current, the aluminum alloy weld pool 70 solidifies to form a weld joint 74 at the faying interface 28, as illustrated generally in FIG. 7. The steel weld pool 72, if formed, likewise solidifies at this time into a steel weld nugget 76 within the steel workpiece 12, although it preferably does not extend to either the faying surface 20 or the electrode-contacting surface 22 of the workpiece 12. The weld joint 74 includes an aluminum alloy weld nugget 78 and, typically, a Fe—Al intermetallic layer 80. The aluminum alloy weld nugget 78 extends into the aluminum alloy workpiece 14 to a distance that often ranges from about 20% to about 80% of the thickness 140 of the aluminum alloy workpiece 14, although on occasion the weld nugget 78 may extend all the way to the electrode-contacting surface 26 (i.e. 100% or full penetration). The Fe—Al intermetallic layer 80 is situated between the aluminum alloy weld nugget 78 and the steel workpiece 12 at the faying interface 28. This layer is generally formed as a result of a reaction between the molten aluminum alloy weld pool 70 and the steel workpiece 12 during current flow and for a short period of time after current flow when the steel workpiece 12 is still hot. It can include $FeAl_3$, $Fe_2Al_5$, and other compounds. When measured in the direction of electrical current flow, the Fe—Al intermetallic layer 80 is typically about 1 µm to about 5 µm thick.

The formation of a concentrated heat zone in the steel workpiece 12—whether by initiation and growth of the molten steel weld pool 72 or not—improves the strength and integrity of the weld joint 74 in at least two ways. First, the concentrated heat changes the temperature distribution through the weld site 16 by altering and creating radial temperature gradients which, in turn, cause the molten aluminum alloy weld pool 70 to solidify from its outer perimeter towards its center. This solidification behavior drives weld defects toward the center of the weld joint 74 where they are less prone to weaken its mechanical properties. Second, in those instances in which the steel weld pool 72 is initiated and grown, the faying surface 20 of the steel workpiece 12 tends to distort away from the electrode-contacting surface 22. Such distortion can make the steel workpiece 12 thicker at the weld site 16 by as much as 50%. Increasing the thickness of the steel workpiece 12 in this way helps keep the center of the molten aluminum alloy weld pool 70 hot so that it cools and solidifies last, which can further increase radial temperature gradients and drive weld defects to conglomerate at or near the center of the weld joint 74. The bulging of the faying surface 20 of the steel workpiece 12 can also interfere with crack growth along the faying interface 28 by deflecting cracks along a non-preferred path into the weld joint 74.

Figure 12:
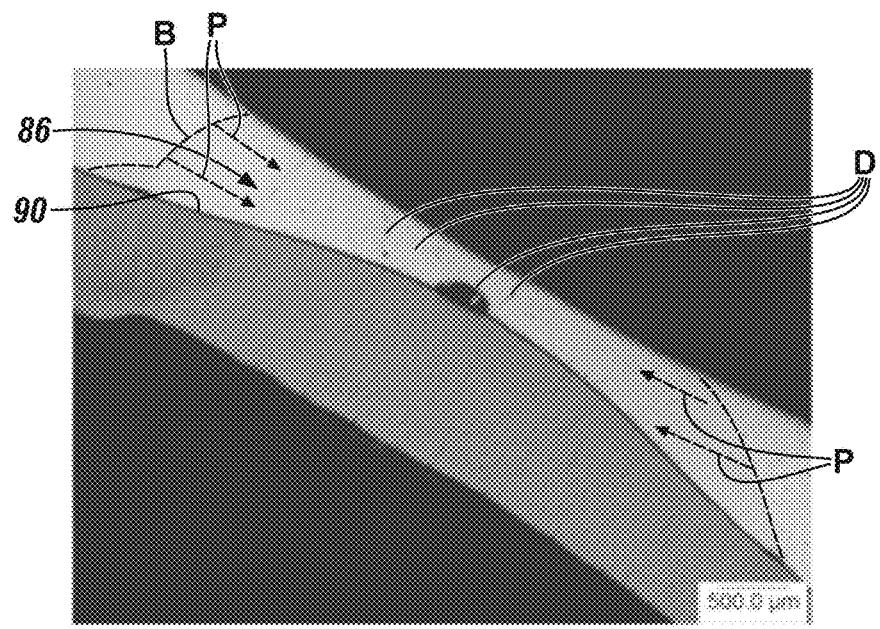
FIG. 12 is a photomicrograph of an aluminum alloy workpiece (upper substrate) and a steel workpiece (lower substrate) that have been resistance spot welded together by a pair of welding electrodes that passed an electrical current through the steel workpiece at a greater current density as compared to the aluminum alloy workpiece.
Figure 13:
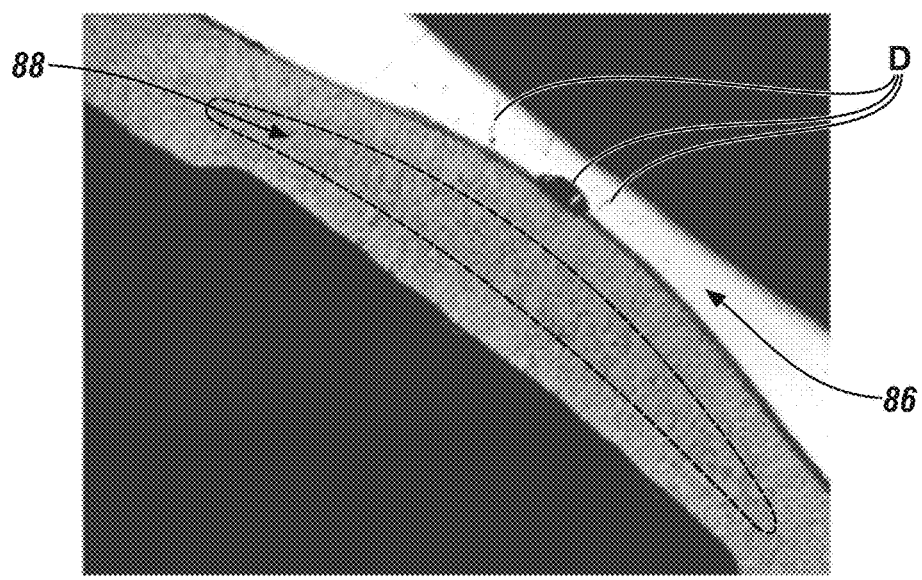
FIG. 13 is a photomicrograph of the structure shown in FIG. 12 after being etched to better show the steel weld nugget that was formed in the steel workpiece.
Figure 14:
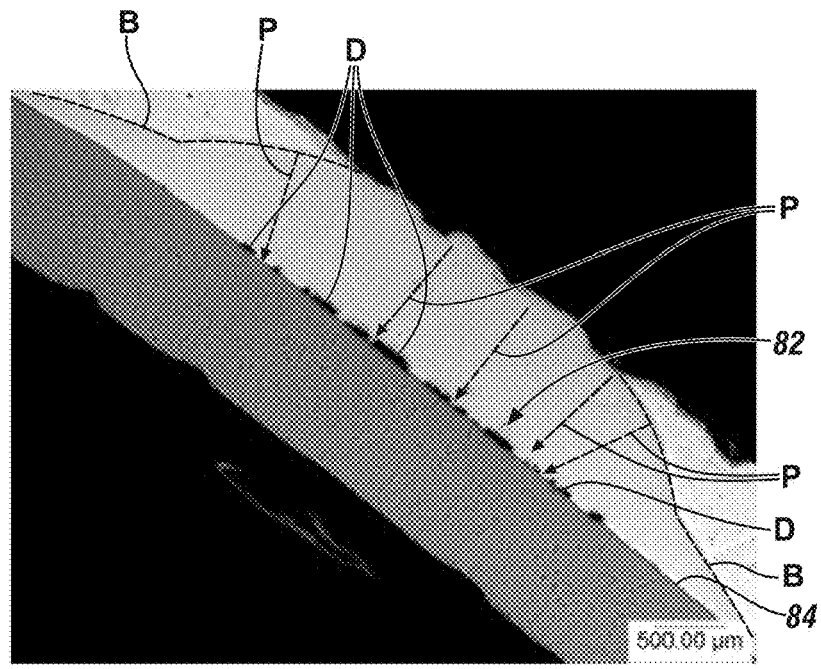
FIG. 14 is a photomicrograph of an aluminum alloy workpiece (upper substrate) and a steel workpiece (lower substrate) that have been resistance spot welded together in a conventional manner.

FIGS. 12-14 show an example of the impact that initiating and growing the steel weld pool 72 can have on the weld joint 74 formed between the steel workpiece 12 and the aluminum alloy workpiece 14. To begin, FIG. 14 shows the microstructure of a weld joint 82 formed by a conventional resistance spot welding process in which a concentrated heat zone was not generated in the steel workpiece (lower substrate). Here, in this example, defects D have been discovered at and along the faying interface 84. These defects D may include shrinkage voids, gas porosity, oxide residue, and micro-cracking, among others. When present and accumulated along the faying interface 84, it has been found that the defects D may reduce the peel strength of the weld joint 82 and, more generally, may negatively impact and weaken the overall integrity of the joint 82. Moreover, in addition to the defects D, one or more Fe—Al intermetallic layers (to small to be shown) may grow between the steel (lower) and aluminum alloy (upper) workpieces at and along the faying interface 84.

Without being bound by theory, it is believed that the accumulation of the defects D at and along the faying interface 84 is due at least in part to the solidification behavior of the molten aluminum alloy weld pool. Specifically, a heat imbalance can develop between the much hotter steel workpiece (lower substrate) and the aluminum alloy workpiece (upper substrate) because of the dissimilar physical properties of the two materials—namely, the much greater thermal and electrical resistivities of the steel. The steel workpiece therefore acts as a heat source while the aluminum alloy workpiece acts as a heat conductor, creating a strong temperature gradient in the vertical direction that causes the molten aluminum alloy weld pool to cool and solidify from the region proximate the cooler (e.g., water cooled) welding electrode in contact with the aluminum alloy workpiece towards the faying interface 84. The path and direction of the solidification front is represented generally in FIG. 14 by broken arrows P, and a boundary of the weld joint 82 is represented generally by broken lines B. As the solidification front progresses along path P, the defects D are driven toward the faying interface 84 and may end up dispersed along the faying interface 84, as shown. The slanted boundary B is the result of solidification toward the faying interface 84.

FIGS. 12-13 show the microstructure of a weld joint 86 formed by a resistance spot welding process in which the current density was greater in the steel workpiece (lower substrate) such that a molten steel weld pool was initiated and grown within the workpiece. Here, the initiation and growth of the molten steel weld pool is believed to have been caused by the additional heat created within the steel workpiece by concentrating current in a smaller zone than would have otherwise occurred. Since the heat was concentrated at a localized region within the steel workpiece (lower substrate), more avenues for heat dissipation and greater radial temperature gradients are provided at the weld site. In particular, heat from the molten aluminum alloy weld pool can dissipate laterally into adjacent colder portions of the aluminum alloy workpiece. Heat from the molten steel weld pool can also migrate up into the molten aluminum alloy weld pool and then through the aluminum alloy workpiece as it cools and solidifies into the steel weld nugget 88 (FIG. 13), which helps keep the center of the aluminum alloy weld pool at an elevated temperature for prolonged period.

The altered temperature gradients at the weld site change the cooling action of the molten aluminum alloy weld pool as it solidifies to become the weld joint 86 within the aluminum alloy workpiece (upper substrate) and at the faying interface 90. Instead of the solidification front progressing toward the faying interface 90, as shown in FIG. 14, the molten aluminum alloy weld pool cools radially and solidifies from its outer perimeter towards its center. The path and direction of the solidification front is represented generally in FIG. 12 by broken arrows P, and a boundary of the weld joint 86 is represented by broken lines B. The path P is pointed toward the central region and the boundary B is more orthogonal (compared to that shown in FIG. 14) relative to the faying interface 90 as a result of the altered solidification path. Solidifying the molten aluminum alloy weld pool in this manner tends to push the defects D toward the center of the joint 86, as depicted. The steel weld nugget 88 formed in the steel workpiece (lower substrate) is shown best in FIG. 13 (in which the photographed material was etched to show the steel weld nugget).

It can be seen that the initiation and growth of the molten steel weld pool has pushed the faying surface of the steel workpiece (lower substrate) outwardly into the aluminum alloy workpiece (upper substrate). The steel workpiece has thus become thicker at the weld site. The thicker portion of the steel workpiece provides a larger, high temperature thermal mass at the center of the molten aluminum alloy weld pool, which helps keep the center of the aluminum alloy weld pool hot so that it solidifies last. As a result, the weld defects D in this example have not only been driven to the center of the weld joint, but have additionally congregated at the center of the weld joint 86 adjacent to the faying interface 90. Locating the defects here is more conducive to good peel strength and joint integrity than if the defects are spread out along the faying interface 90 as depicted in FIG. 14.

Referring now back to FIGS. 6-7, the steel and aluminum alloy welding electrodes 36, 40 are refracted from their clamped positions soon after passage of the electrical current between the welding electrodes 36, 40 has ceased, leaving behind contact patches 66, 68 of asymmetric surface area on the electrode-contacting surfaces 22, 26 of the steel and aluminum workpieces 12, 14. The stack-up 10 is then re-located between the steel and aluminum alloy welding electrodes 36, 40 at a different weld site 16, or it is moved away so that another stack-up 10 can be located for spot welding. More spot welds are then formed in the same way.

Figure 8:
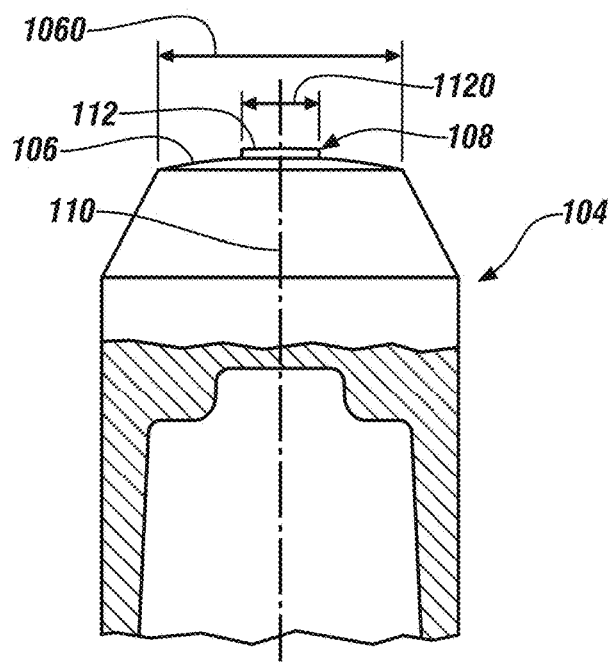
FIG. 8 is a side elevational view of a multi-functional welding electrode that can be used as the steel welding electrode, the aluminum alloy welding electrode, or both welding electrodes during spot welding of the stack-up depicted in FIGS. 1-3.
Figure 9:
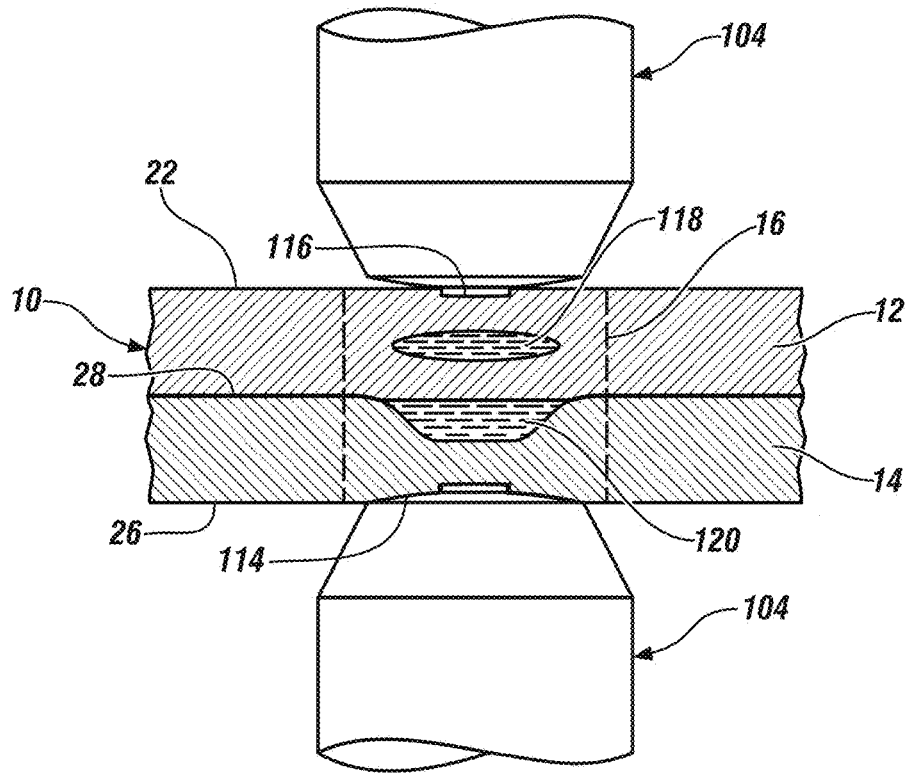
FIG. 9 is a partial cross-sectional view (stack-up shown in cross-section) of the stack-up during spot welding in which the multi-functional welding electrode shown in FIG. 8 is being used as both the steel welding electrode and the aluminum alloy welding electrode.

FIGS. 8-9 illustrate another spot welding process in which the stack-up 10 is spot welded at the weld site 16 to achieve basically the same effects as before but, in this embodiment, similarly-constructed multi-functional welding electrodes 104 are used on each side of the stack-up 10 instead of the welding electrodes 36, 40 shown in FIGS. 4 and 5. As depicted in FIG. 8, each of the welding electrodes 104 has the same basic components as the aluminum alloy welding electrode 40 shown in FIG. 5 with the exception of one main difference—namely, each welding electrode 104 includes a weld face 106 and a plateau 108 that ascends about a central axis 110 of the weld face 106. The weld face 106 has a diameter 1060 of about 6 mm to 12 mm and a radius of curvature of about 20 mm to about 100 mm. The plateau 108 has a plateau surface 112 that is positively displaced from the weld face 106 by about 0.1 mm to about 0.5 mm. The plateau surface 112 has a diameter 1120 of about 3 mm to about 7 mm and is flatter than the weld face 106—the plateau surface 112 preferably being planar or having a radius of curvature of about 40 mm or greater. Additionally, if desired, the plateau surface 112 and/or the weld face 106 of the two welding electrodes 104 may be textured or include surface intrusions or protrusions as described in U.S. Pat. No. 8,525,066.

The welding electrode 104 shown in FIG. 8 is multi-functional as a result of its ability to function differently when contacting the steel workpiece 12 than when contacting the aluminum alloy workpiece 14, as illustrated in FIG. 9. Specifically, when used on the steel side, the plateau surface 112 of the centrally-located plateau 108 makes contact and impresses into the electrode-contacting surface 22 of the steel workpiece 12. During current flow, the relative hardness of the steel workpiece 12 prevents the surrounding weld face 106 from making contact and impressing into the electrode-contacting surface 22 to a large extent. On the other hand, when used on the aluminum alloy side, the entire plateau 108 and the surrounding weld face 106 contact and impress into the electrode-contacting surface 26 of the softened aluminum alloy workpiece 14. The same welding electrode configuration thus forms a contact patch 114 in the electrode-contacting surface 26 of the aluminum alloy workpiece 14 that is greater in surface area than a contact patch 116 it forms in the electrode-contacting surface 22 of the steel workpiece 12 during spot welding. Upon termination of the electrical current, the contact patch 114 formed in the electrode-contacting surface 26 of the aluminum alloy workpiece 14, like before, is greater in surface area than the contact patch 16 formed in the electrode-contacting 22 surface of the steel workpiece 12 by a ratio of about 1.5:1 to about 16:1, and more preferably by about 2:1 to about 6:1.

The contact patches 114, 116 formed by the welding electrodes 104 at the electrode-contacting surfaces 22, 26 of the steel and aluminum alloy workpieces 12, 14 has the same effect as before. That is, the current density is greater in the steel workpiece 12 than in the aluminum alloy workpiece 14 at the weld site 16, which causes heat to concentrate in a smaller zone within the steel workpiece 12 as compared to the aluminum alloy workpiece 14. The concentrated heat can also be used to initiate and grow a molten steel weld pool 118 within the steel workpiece 12. This concentrated heating zone can, in turn, affect the molten aluminum alloy weld pool 120 in the same ways as already discussed. Furthermore, the use of similarly-constructed welding electrodes 104 on each side of the stack-up 10 has the added advantage of not having to orient the stack-up 10 so that the workpieces 12, 14 match a particular welding electrode. Multiple stack-ups 10 can thus be sequentially spot welded without having to flip or re-orient the stack-up 10 if necessary to achieve a specific electrode/workpiece pairing.

Figure 15:
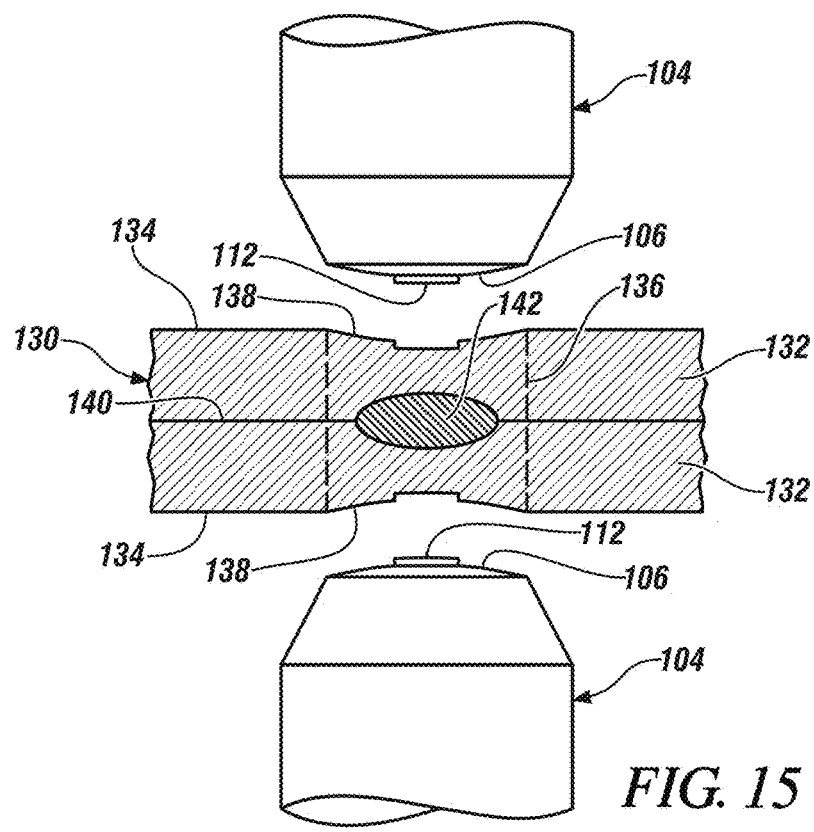
FIG. 15 is a partial cross-sectional view of a stack-up, which includes a pair of aluminum alloy workpieces, after being resistance spot welded together using the multi-functional welding electrode shown in FIG. 8 on each side of the stack-up.

After spot welding the stack-up 10—which includes the steel workpiece 12 and the aluminum alloy workpiece 14—it is possible to change course and use the two similarly-constructed welding electrodes 104 to spot weld a stack-up 130 that includes two or more aluminum alloy workpieces 132, as shown in FIG. 15. During the spot welding process, the welding electrodes 104 are brought into contact with opposed electrode-contacting surfaces 134 at a weld site 136 and an electrical current is passed between them. Initially, only the plateau surface 112 of each of the welding electrodes 104 contacts its respective electrode-contacting surface 134. The plateau surfaces 112 soon impress into the electrode-contacting surfaces 134 and, eventually, so do the surrounding weld faces 106 as the aluminum alloy workpieces 132 soften to form contact patches 138 of approximately the same size and shape. Resistance to the flow of the electrical current being passed through the workpieces 132 and across a faying interface 140 generates heat and initiates a molten aluminum alloy weld pool (not shown in FIG. 15) at the faying interface 140. This weld pool penetrates into the overlapping aluminum alloy workpieces 132 and, upon cessation of the electrical current, cools and solidifies into an aluminum alloy weld nugget 142.

Figure 16:
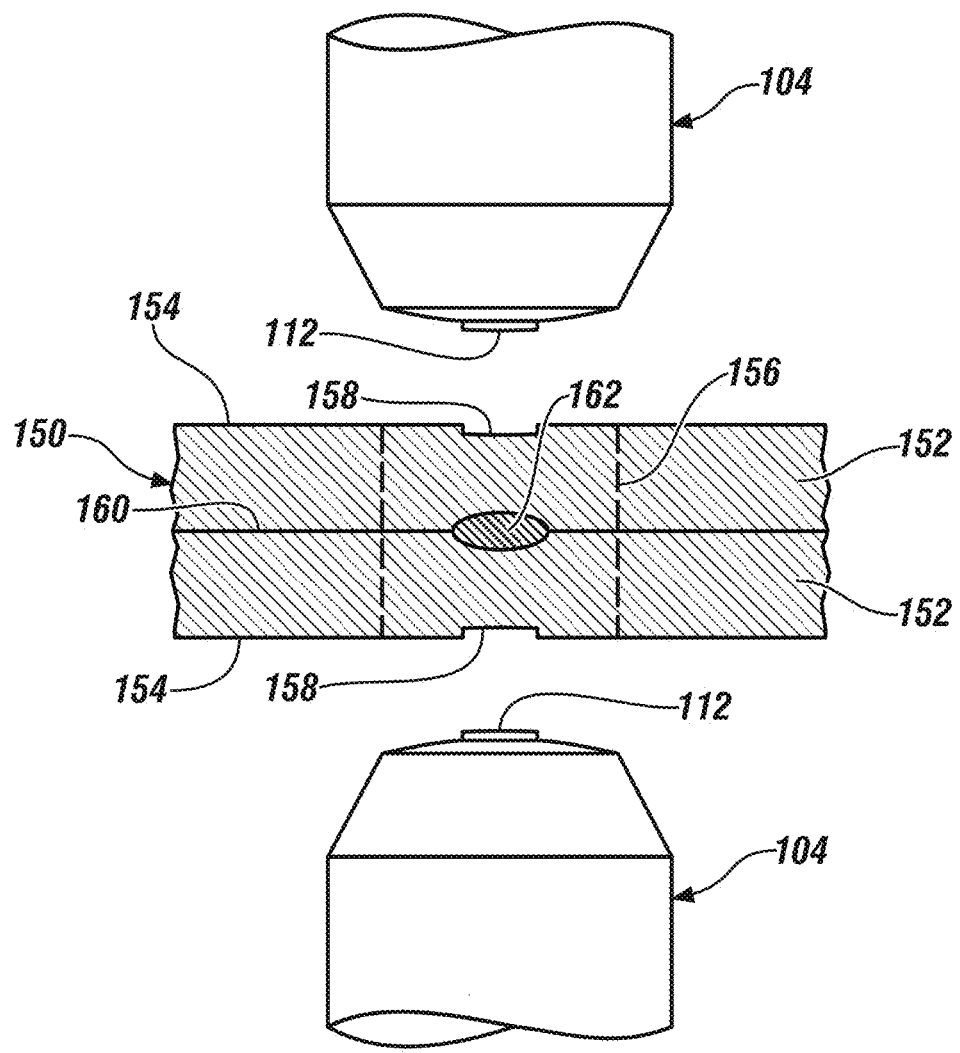
FIG. 16 is a partial cross-sectional view of a stack-up, which includes a pair of steel workpieces, after being resistance spot welded together using the multi-functional welding electrode shown in FIG. 8 on each side of the stack-up.

Similarly, as shown in FIG. 16, it is possible to use the two similarly-constructed welding electrodes 104 to spot weld a stack-up 150 that includes two or more steel workpieces 152. During the spot welding process, the welding electrodes 104 are brought into contact with opposed electrode-contacting surfaces 154 at a weld site 156. An electrical current is then passed between the two electrodes 104. Here, because of the relative hardness of steel, the plateau surface 112 of each welding electrode mainly contacts and impresses into its respective electrode-contacting surface 154 to form contact patches 158 of approximately the same size and shape. Resistance to the flow of the electrical current being passed through the workpieces 152 and across a faying interface 160 generates heat and initiates a molten steel weld pool (not shown in FIG. 16) at the faying interface 160. This weld pool penetrates into the overlapping steel workpieces 154 and, upon cessation of the electrical current, cools and solidifies into a steel weld nugget 162.

Figure 10:
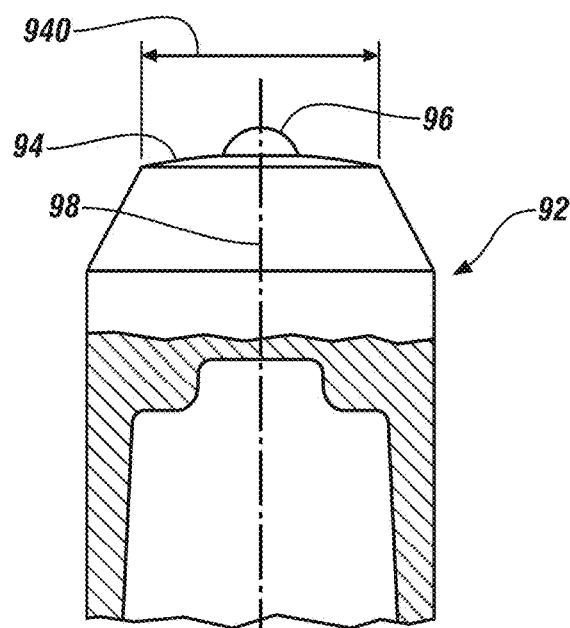
FIG. 10 is a side elevational view of another multi-functional welding electrode that can be used as the steel welding electrode, the aluminum alloy welding electrode, or both welding electrodes during spot welding of the stack-up depicted in FIGS. 1-3.
Figure 11:
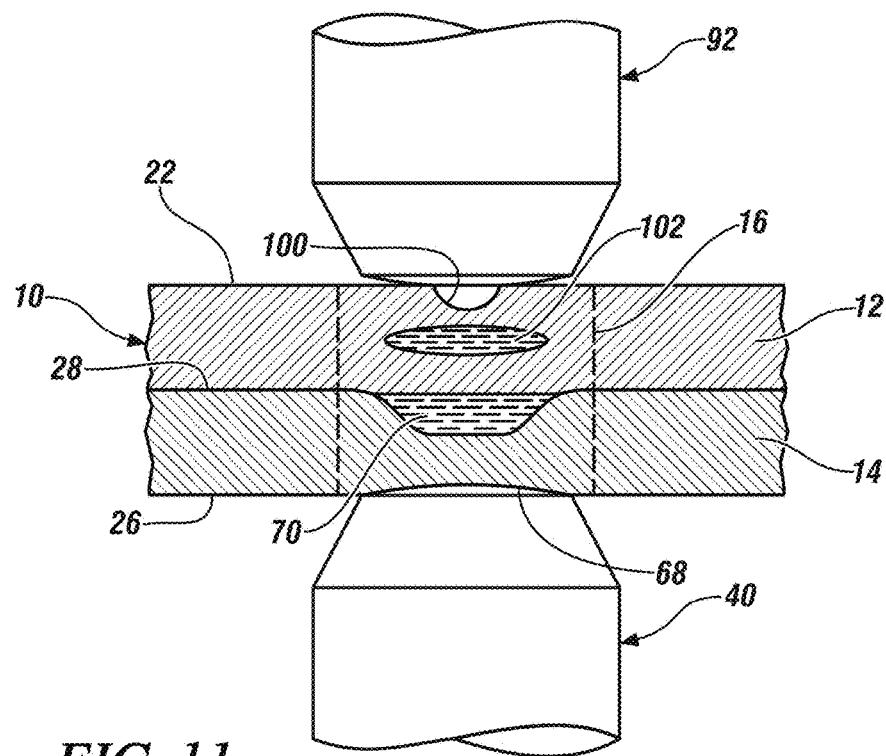
FIG. 11 is a partial cross-sectional view (stack-up shown in cross-section) of the stack-up during spot welding in which the multi-functional welding electrode shown in FIG. 10 is contacting an electrode-contacting surface of the steel workpiece and the aluminum alloy welding electrode shown in FIG. 5 is contacting an electrode-contacting surface of the aluminum alloy workpiece.

FIGS. 10-11 illustrate another spot welding process in which the stack-up 10 is spot-welded at the weld site 16 to achieve basically the same effects as before but with a different multi-functional welding electrode 92 than what is shown in FIG. 8. The multi-functional spot welding electrode 92 used here is shown in FIG. 10 and has the same basic components as the steel welding electrode 36 shown in FIG. 4 with the exception of one main difference. That is, the multi-functional welding electrode 92 includes a radiused weld face 94 and a rounded projection 96 that ascends about a central axis 98 of the weld face 94. The weld face 94 has a diameter 940 of about 6 mm to 12 mm and a radius of curvature of about 20 mm to about 100 mm. The rounded projection 96 is preferably spherical in shape with a diameter at the weld face 94 that ranges from about 3 mm to about 7 mm and a radius of curvature that ranges from about 5 mm to about 20 mm.

The welding electrode 92 shown in FIG. 9, like the welding electrode 104 shown in FIG. 8, is multi-functional as a result of its ability to function differently when contacting the steel workpiece 12 than when contacting the aluminum alloy workpiece 14. For this reason, the multi-functional welding electrode 104 could be used on each side of the stack-up 10 instead of the welding electrodes 36, 40 shown in FIGS. 4 and 5 in similar fashion to the multi-functional welding electrode 104 shown in FIG. 8. When the multi-functional welding electrode 92 shown here is used on both sides of the workpiece stack-up 10, the rounded projection 96 contacts and impresses into the steel workpiece 12 and the surrounding weld face 94 generally does not, while both the rounded projection 96 and the surrounding weld face 94 contact and impress into the aluminum alloy workpiece 14. The same welding electrode configuration thus forms a contact patch in the electrode-contacting surface 26 of the aluminum alloy workpiece 14 that is greater in surface area than a contact patch it forms in the electrode-contacting surface 22 of the steel workpiece 12 during spot welding to the same extent as previously stated.

The multi-functional spot welding electrodes 104, 92 depicted in FIGS. 8 and 10 do not necessarily have to be used together on each side of the workpiece stack-up 10 as both welding electrodes. Each of the multi-functional welding electrodes 104, 92 can be substituted for the steel welding electrode 36 of FIG. 4 and used in conjunction with the aluminum alloy welding electrode 40 of FIG. 5. Likewise, each of the multi-functional welding electrodes 104, 92 can be substituted for the aluminum alloy welding electrode 40 of FIG. 5 and used in conjunction with the steel welding electrode 36 of FIG. 4. To demonstrate, in the embodiment depicted in FIG. 11, the multi-functional welding electrode 92 illustrated in FIG. 10 is used on the steel side of the workpiece stack-up 10 with the aluminum alloy welding electrode 40 described above in FIG. 5 being used on the aluminum alloy side.

When substituted for the steel welding electrode 36 shown in FIG. 4 as part of the spot welding process described above (FIGS. 1-3 and 6-7), the rounded projection 96 indents into the electrode-contacting surface 22 of the steel workpiece 12 to form a contact patch 100, which may be sharper than the contact patch 66 formed by the steel welding electrode 36 of FIG. 4. The contact patch 68 formed in the electrode-contacting surface 26 of the aluminum alloy workpiece 14, like before, is greater in surface area than the contact patch 100 formed in the electrode-contacting surface 22 of the steel workpiece 12 by a ratio of about 1.5:1 to about 16:1, and more preferably by about 2:1 to about 6:1, upon termination of the electrical current being passed. The spot welding process including the formation of the weld joint and the concentrated heat zone within the steel workpiece 12 are basically the same. Here, however, it is possible that the contact patch 100 attributed to the rounded projection 96 may increase the current density within the steel workpiece 12 and create steeper radial temperature gradients relative the flatter weld face 60 of the previously-described steel welding electrode 36. The rounded projection and its heat-concentrating effect may thus initiate a smaller zone of heat concentration within the steel workpiece 12 and, consequently, a smaller molten steel weld pool 102 if initiated in the first place.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of spot welding a steel workpiece to an aluminum alloy workpiece, the method comprising:
   providing a stack-up that includes a steel workpiece and an aluminum alloy workpiece, the steel workpiece and the aluminum alloy workpiece overlapping to provide a faying interface;
   contacting an electrode-contacting surface of the steel workpiece with a steel welding electrode;
   contacting an electrode-contacting surface of the aluminum alloy workpiece with an aluminum alloy welding electrode;
   passing an electrical current between the steel and aluminum alloy welding electrodes and through the stack-up to initiate a molten aluminum alloy weld pool within the aluminum alloy workpiece and at the faying interface, the electrical current having a greater current density in the steel workpiece than in the aluminum alloy workpiece; and
   ceasing passage of the electrical current at which time a contact patch formed by the aluminum alloy welding electrode at the electrode-contacting surface of the aluminum alloy workpiece is greater in surface area than a contact patch formed by the steel welding electrode at the electrode-contacting surface of the steel workpiece, the contact patch formed by the aluminum alloy welding electrode having a surface area that is greater than the contact patch formed by the steel welding electrode by a ratio of 1.5:1 to 16:1.

2. The method set forth in claim 1, wherein the contact patch formed by the aluminum alloy welding electrode has a surface area that is greater than the contact patch formed by the steel welding electrode by a ratio of 2:1 to 6:1.

3. The method set forth in claim 1, wherein the aluminum alloy welding electrode comprises a weld face having a diameter between 6 mm and 20 mm and is planar or has a radius of curvature of 15 mm or greater, and wherein the steel welding electrode comprises a weld face having a diameter between 4 mm and 16 mm and a radius of curvature of 20 mm or greater.

4. The method set forth in claim 3, wherein the weld face of the aluminum alloy welding electrode includes concentric rings of ridges that project outwardly from a base surface of the weld face of the aluminum alloy welding electrode.

5. The method set forth in claim 1, wherein at least one of the aluminum alloy welding electrode or the steel welding electrode has a weld face and a rounded projection that ascends about a central axis of the weld face, the weld face having a diameter of 6 mm to 12 mm and a radius of curvature of 20 mm to 100 mm, and the rounded projection having a diameter of 3 mm to 7 mm at the weld face and a radius of curvature of 5 mm to 20 mm.

6. The method set forth in claim 1, wherein at least one of the aluminum alloy welding electrode or the steel welding electrode has a weld face and a plateau that is positively displaced from the weld face and ascends about a central axis of the weld face.

7. The method set forth in claim 6, wherein the weld face has a diameter of 6 mm to 12 mm and a radius of curvature of 20 mm to 100 mm, and wherein a plateau surface of the plateau on the weld face has a diameter of 3 mm to 7 mm and a radius of curvature of 40 mm or greater while being flatter than the weld face.

8. The method set forth in claim 1, wherein the act of passing an electrical current between the steel and aluminum alloy welding electrodes and through the stack-up initiates a molten steel weld pool within the steel workpiece.

9. The method set forth in claim 8, wherein the molten steel weld pool distorts a faying surface of the steel workpiece away from the electrode-contacting surface of the steel workpiece to thicken the steel workpiece.

10. The method set forth in claim 8, wherein, upon ceasing passage of the electrical current, the molten aluminum alloy weld pool solidifies into a weld joint that includes an aluminum alloy weld nugget and the molten steel weld pool solidifies into a steel weld nugget, the steel weld nugget not extending to a faying surface of the steel workpiece.

11. The method set forth in claim 1, wherein, upon ceasing passage of the electrical current, the molten aluminum alloy weld pool solidifies into a weld joint that includes an aluminum alloy weld nugget and a Fe—Al intermetallic layer.

12. A method of spot welding a steel workpiece to an aluminum alloy workpiece, the method comprising:
providing a stack-up that includes a steel workpiece and an aluminum alloy workpiece, the steel workpiece and the aluminum alloy workpiece overlapping to provide a faying interface;
contacting an electrode-contacting surface of the steel workpiece with a steel welding electrode;
contacting an electrode-contacting surface of the aluminum alloy workpiece with an aluminum alloy welding electrode;
passing an electrical current between the steel and aluminum alloy welding electrodes and through the stack-up such that a current density of the passing electrical current is greater in the steel workpiece than in the aluminum alloy workpiece to thereby concentrate heat within a smaller zone in the steel workpiece as compared to the aluminum alloy workpiece;
initiating a molten aluminum alloy weld pool within the aluminum alloy workpiece and at the faying interface;
initiating a steel weld pool within the steel workpiece that distorts a faying surface of the steel workpiece away from the electrode-contacting surface of the steel workpiece to thicken the steel workpiece; and
ceasing passage of the electrical current at which time a contact patch formed by the aluminum alloy welding electrode at the electrode-contacting surface of the aluminum alloy workpiece is greater in surface area than a contact patch formed by the steel welding electrode at the electrode-contacting surface of the steel workpiece, the contact patch formed by the aluminum alloy welding electrode having a surface area that is greater than the contact patch formed by the steel welding electrode by a ratio of 1.5:1 to 16:1.

13. The method set forth in claim 12, wherein, upon ceasing passage of the electrical current, the molten aluminum alloy weld pool solidifies into a weld joint that includes an aluminum alloy weld nugget and the molten steel weld pool solidifies into a steel weld nugget.

14. The method set forth in claim 13, wherein the steel weld nugget does not extend to a faying surface of the steel workpiece.

15. The method set forth in claim 12, wherein the aluminum alloy welding electrode comprises a weld face having a diameter between 6 mm and 20 mm and is planar or has a radius of curvature of 15 mm or greater, and wherein the steel welding electrode comprises a weld face having a diameter between 4 mm and 16 mm and a radius of curvature of 20 mm or greater.

16. The method set forth in claim 15, wherein the weld face of the aluminum alloy welding electrode includes concentric rings of ridges that project outwardly from a base surface of the weld face of the aluminum alloy welding electrode.

17. The method set forth in claim 12, wherein at least one of the aluminum alloy welding electrode or the steel welding electrode has a weld face and a rounded projection that ascends about a central axis of the weld face, the weld face having a diameter of 6 mm to 12 mm and a radius of curvature of 20 mm to 100 mm, and the rounded projection having a diameter of 3 mm to 7 mm at the weld face and a radius of curvature of 5 mm to 20 mm.

18. The method set forth in claim 12, wherein at least one of the aluminum alloy welding electrode or the steel welding electrode has a weld face and a plateau that is positively displaced from the weld face and ascends about a central axis of the weld face, wherein the weld face has a diameter of 6 mm to 12 mm and a radius of curvature of 20 mm to 100 mm, and wherein a plateau surface of the plateau on the weld face has a diameter of 3 mm to 7 mm and a radius of curvature of 40 mm or greater while being flatter than the weld face.

19. A method of spot welding comprising:
providing a first workpiece stack-up that includes a steel workpiece and an aluminum alloy workpiece, the steel workpiece and the aluminum alloy workpiece overlapping to provide a faying interface;
contacting an electrode-contacting surface of the steel workpiece with a first welding electrode and contacting an electrode-contacting surface of the aluminum alloy workpiece with second welding electrode, the first and second welding electrodes being pressed against their respective workpiece surfaces in diametric alignment at a weld site, each of the first and second welding electrodes having the same construction;
passing an electrical current between the first and second welding electrodes and through the first workpiece stack-up at the weld site to initiate and grow a molten aluminum alloy weld pool in the aluminum alloy workpiece that wets an adjacent faying surface of the steel workpiece, the electrical current having a greater current density in the steel workpiece than in the aluminum alloy workpiece;

ceasing passage of the electrical current and retracting the first and second welding electrodes from the steel and aluminum alloy workpieces;

providing a second workpiece stack-up that comprises either (1) a steel workpiece and another steel workpiece that overlap to provide a faying interface between the steel workpieces or (2) an aluminum alloy workpiece and another aluminum alloy workpiece that overlap to provide a faying interface between the aluminum alloy workpieces;

contacting opposite sides of the second workpiece stack-up with the first and second welding electrodes and passing an electrical current between the first and second welding electrodes and through the second workpiece stack-up, the electrical current initiating and growing a molten aluminum alloy weld pool at a faying interface of the overlapping aluminum alloy workpieces if the second workpiece stack-up includes aluminum alloy workpieces, or initiating and growing a molten steel weld pool at a faying interface of the overlapping steel workpieces if the workpiece stack-up includes steel workpieces.

20. The method set forth in claim 19, wherein, during passage of the electrical current between the first and second welding electrodes and through the first workpiece stack-up, the first welding electrode is pressed into the aluminum alloy workpiece to form a contact patch at the electrode-contacting surface of the aluminum alloy workpiece and the second welding electrode is pressed into the steel workpiece to form a contact patch at the electrode-contacting surface of the steel workpiece, and wherein, at the time passage of the electrical current has ceased, the contact patch formed by the first welding electrode is greater in surface area than the contact patch formed by the second welding electrode by a ratio of 1.5:1 to 16:1.

* * * * *